United States Patent
Apelsmeier et al.

(10) Patent No.: US 11,831,248 B2
(45) Date of Patent: Nov. 28, 2023

(54) INVERTER INCLUDING DC/AC CONVERTER AND DC/DC CONVERTER CONNECTIBLE TO ROTOR AND STATOR INCLUDED IN ELECTRIC MACHINE

(71) Applicant: AUDI AG, Ingolstadt (DE)

(72) Inventors: Andreas Apelsmeier, Pollenfeld (DE); Stephan Brüske, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/351,011

(22) Filed: Jun. 17, 2021

(65) Prior Publication Data

US 2021/0399649 A1 Dec. 23, 2021

(30) Foreign Application Priority Data

Jun. 18, 2020 (DE) .......................... 102020116161.1

(51) Int. Cl.
  *H02M 7/53* (2006.01)
  *H02M 7/537* (2006.01)
  *H02M 1/00* (2006.01)
  *H02M 3/158* (2006.01)
  *H02P 27/06* (2006.01)

(52) U.S. Cl.
  CPC ........... *H02M 7/537* (2013.01); *H02M 1/007* (2021.05); *H02M 3/158* (2013.01); *H02P 27/06* (2013.01)

(58) Field of Classification Search
  CPC ...... H02M 7/537; H02M 1/007; H02M 3/158; H02P 27/06
  See application file for complete search history.

(56) References Cited

U.S. PATENT DOCUMENTS

| | | | |
|---|---|---|---|
| 6,543,561 B1* | 4/2003 | Pels | F02N 11/08 180/65.23 |
| 2004/0217723 A1* | 11/2004 | Cai | F02N 11/0866 318/268 |
| 2010/0116571 A1* | 5/2010 | Suzuki | B60L 53/16 903/951 |
| 2012/0126614 A1* | 5/2012 | Inoue | H02J 7/345 307/10.1 |
| 2014/0184303 A1 | 7/2014 | Hasegawa et al. | |
| 2018/0370385 A1* | 12/2018 | Straßer | G08G 1/096758 |
| 2019/0047433 A1* | 2/2019 | Rozman | B60L 58/12 |
| 2020/0139801 A1* | 5/2020 | Lamers | B60K 17/16 |
| 2021/0260984 A1* | 8/2021 | Campton | B60K 6/383 |

FOREIGN PATENT DOCUMENTS

| | | |
|---|---|---|
| CN | 106972802 A | 7/2017 |
| DE | 102013114271 A1 | 6/2015 |
| DE | 102015009490 A1 | 1/2017 |
| DE | 112016003958 T5 | 5/2018 |
| DE | 102019104688 A1 | 8/2019 |
| EP | 3217535 A1 | 9/2017 |

* cited by examiner

*Primary Examiner* — Rafael O De Leon Domenech
(74) *Attorney, Agent, or Firm* — Seed IP Law Group LLP

(57) ABSTRACT

An inverter for an electric machine is provided. The electric machine includes a rotor and a stator. The inverter includes a DC/AC converter and a DC/DC converter. The DC/AC converter includes at least one chip of silicon carbide having at least one MOSFET. The DC/DC converter includes at least one chip of silicon having at least one IGBT. The DC/DC converter is connectible to a first one of the rotor or the stator of the electric machine and the DC/AC converter is connectible to a second one of the rotor or the stator of the electric machine.

8 Claims, 2 Drawing Sheets

INVERTER INCLUDING DC/AC CONVERTER AND DC/DC CONVERTER CONNECTIBLE TO ROTOR AND STATOR INCLUDED IN ELECTRIC MACHINE

BACKGROUND

Technical Field

The present disclosure relates to an inverter for an electric machine and a method for exchanging electric energy between an electric energy storage and an electric machine.

An electric machine is provided with electric energy as current or as voltage from an electric energy source. It may be beneficial to adapt the current or the voltage to the operation of the electric machine.

Description of the Related Art

An inverter is known from publication DE 10 2013 114 271 A1.

Publication EP 3 217 535 A1 describes a drive mechanism for a motor.

A power semiconductor device is known from publication US 2014/184303 A1.

Against this background, one problem was to supply an electric machine efficiently with electric energy.

BRIEF SUMMARY

An inverter according to the disclosure is designed for an electric machine including as its components a rotor and a stator. The inverter includes a direct current/direct current (DC/DC) converter and a direct current/alternating current (DC/AC) converter. The DC/AC converter includes at least one chip of silicon carbide (SiC) having at least one MOSFET (Metal Oxide Semiconductor Field-Effect Transistor), in one example, at least one SiC-MOSFET. The DC/DC converter includes at least one chip of silicon having at least one IGBT (Insulated Gate Bipolar Transistor), especially at least one Si-IGBT. The DC/DC converter having the Si-based IGBT is connectible, to be connected, or connected to a first one of the two components of the electric machine and the DC/AC converter having the SiC-based MOSFET to a second one of the two components of the electric machine.

In its configuration, the DC/DC converter of the inverter is connected or connectible to the rotor as the defined first component of the electric machine and the DC/AC converter of the inverter is connected or connectible to the stator as the defined second component of the electric machine. In a possible alternative configuration, it is conceivable for the DC/DC converter of the inverter to be connected or connectible to the stator as the defined first component of the electric machine and the DC/AC converter of the inverter to be connected or connectible to the rotor as the defined second component of the electric machine.

The inverter is designed for an electric machine which is designed as an externally excited synchronous machine (EESM). Furthermore, the inverter may be configured or designated as a pulse inverter.

The DC/DC converter includes two direct current terminals, one of these two terminals being configured or designated as the input and the other as the output. The DC/AC converter comprises one direct current terminal and one alternating current terminal, one of these two terminals being configured or designated as the input and the other as the output. A first direct current terminal of the DC/DC converter and a direct current terminal of the DC/AC converter is respectively connectible, to be connected, or connected to a direct current electric source as the energy source. Furthermore, a second direct current terminal of the DC/DC converter is connectible, to be connected, or connected to the first component of the electric machine, i.e., to the rotor or to the stator. The alternating current terminal of the DC/AC converter is connectible, to be connected, or connected to the second component, i.e., to the stator or to the rotor, of the electric machine.

The method according to the disclosure is designed for exchanging electric energy between an electric machine and an electric energy source having an inverter, such as one embodiment of the above-described inverter. The electric machine includes as its components a rotor and a stator. The inverter includes a DC/AC converter and a DC/DC converter. The DC/AC converter includes at least one chip of silicon carbide having at least one MOSFET (Metal Oxide Semiconductor Field-Effect Transistor) and the DC/DC converter includes at least one chip of silicon having at least one IGBT (Insulated Gate Bipolar Transistor). The inverter is connected on the one hand to the electric energy source, while a direct current terminal of one of the two converters is connected each time to the electric energy source. On the other hand, the DC/DC converter, or here its other direct current terminal, is connected to a first one of the two components, i.e., the rotor or the stator, of the electric machine, and the DC/AC converter, or here its alternating current terminal, is connected to a second one of the two components, i.e., the stator or the rotor, of the electric machine. Moreover, it is conceivable to have additional switches by which it is optionally possible to connect the DC/DC converter to the rotor or to the stator and to optionally connect the DC/AC converter to the stator or to the rotor.

The method is provided in an embodiment for an electric energy source which is designed as a direct current source, wherein the DC/DC converter is used to convert a direct current of the direct current source into a direct current for the first component of the electric machine, and wherein the DC/AC converter is used to convert a direct current of the direct current source into an alternating current for the second component of the electric machine. It is then possible, if the electric machine is operated as a motor, to transform electric energy from the electric energy source into mechanical energy. In one possible alternative or supplemental variant, the electric machine may be operated as a generator and be adapted to transform mechanical energy into electric energy, wherein at least electric energy of the second component of the electric machine, which is provided as alternating current or as alternating voltage, is transformed by the DC/AC converter into a direct current or a DC voltage and provided to the electric energy source, such as an electric energy storage. The electric energy source may be designed as a battery or storage cell or as a power grid, such as the onboard network of a vehicle.

The method and the inverter may be used or employed for an electric machine of a vehicle, and the vehicle may then be driven with the electric machine.

In a system including the electric machine and the inverter, it is proposed to use MOSFETs made of silicon carbide (SiC) in the direct current/alternating current path or the DC/AC path of the externally excited synchronous machine and to use IGBTs in the direct current/direct current path or DC/DC path of the externally excited synchronous machine (EESM), thereby producing a new degree of freedom for the dimensioning of the externally excited synchronous machine. The externally excited synchronous machine and the associated power electronics are designed mutually. This can help reduce the alternating currents in order to reduce the chip surface of the SiC-MOSFETs. This can also help maintain the thermal losses of the rotor of the externally excited synchronous machine, which is not critical when using an internal rotor cooling.

The approach proposed according to the system and described above produces a reduction of the chip surface of the SiC-MOSFETs and thus a direct reduction of the costs of the inverter. Furthermore, there is a reduction of the copper in the stator. The costs for the chip surface of the IGBT and for the slip ring carrier may increase. But since silicon is much cheaper than SiC by a factor of 3 to 5 per mm2, significant cost benefits will be achieved in the inverter. The direct current of the externally excited synchronous machine is boosted by the system by around 10% to 20%, so that the slip ring carriers become somewhat more costly. But if the cost reduction of the SiC-MOSFETs and the described cost increase are combined, cost savings are to be expected in the axle area or the axle being driven by the externally excited synchronous machine.

The following Table 1 shows one possible design example for a system including the electric machine, here, an externally excited synchronous machine (EESM), and the corresponding inverter:

TABLE 1

|  | old EESM design | new EESM design |
| --- | --- | --- |
| AC current | 100 A | 87.5 A |
| DC current of EESM | 5 A | 7 A |
| Chip surface of SiC-MOSFET | 100 mm$^2$ | 87.5 mm$^2$ |
| Chip surface of Si-IGBT | 5 mm$^2$ | 7 mm$^2$ |

It can be seen, with the aid of the sample design, that the overall chip surface becomes smaller. Under the assumption that the SiC for the MOSFET causes around 50% of the costs of the pulse inverter, and disregarding the increase in the chip surface of the IGBT made of silicon, there can be expected a cost reduction of around 6% in the pulse inverter.

The proposed inverter is envisioned as part of the power electronics circuit of an electric machine which is used as the electric drive for a vehicle, such as an automobile. The power electronics is used as a traction inverter to drive the generally three-phase electric machine, such as an externally excited synchronous machine. IGBTs or SiC-MOSFETs are used predominantly as switches for the actuating in the automotive inverter, such as a traction inverter, in a vehicle designed as or designated as an electric vehicle, and/or for battery voltages greater than 200 V. An induction machine or a permanently excited synchronous machine may be used in the electrically driven vehicle. The pulse inverter may be used as an actuating unit for these two variants of a machine. If an externally excited synchronous machine (EESM) is used, then the DC/DC or direct current/direct current converter is provided in addition to the DC/AC or direct current/alternating current converter in the pulse inverter to generate the current for the rotor.

The IGBTs and MOSFETs are used as power semiconductors for the inverter.

In a system such as a drive unit, having an electric machine and power electronics, which is designed for a voltage of 400 V, IGBTs made of silicon are employed. If these are used both in the direct current/alternating current or DC/AC converter and for the DC/DC converter of the externally excited synchronous machine (EESM), the drive unit will be dimensioned in terms of a design premise such that the smallest possible direct current or DC is provided, in order to optimize the losses in the rotor and to reduce the size of the slip ring carrier. A further design premise is the proper dimensioning of the alternating currents or AC in order to generate the required torque.

If SiC-MOSFETs are used in the DC/AC conversion path of the inverter, these will be a major cost component in the inverter and thus in an overall axle being driven. Reducing the direct current (DC) for the externally excited synchronous machine may result in a large chip surface of the SiC-MOSFETs and a low cost system. Silicon carbide is used in the DC/AC conversion path for reasons of efficiency. While this basically increases the costs, cost benefits occur in terms of the vehicle, thanks to the lower losses especially in partial-load operation if one factors in the capacity saved for the energy source, such as the saved battery capacity.

It is to be understood that the previously mentioned features and those yet to be explained in the following can be used not only in the particular mentioned combination, but also in other combinations or standing alone, without leaving the scope of the present disclosure.

BRIEF DESCRIPTION OF THE SEVERAL VIEWS OF THE DRAWINGS

The disclosure is represented schematically in the drawing with the aid of embodiments and shall be described schematically and in detail, making reference to the drawing.

DETAILED DESCRIPTION

Figure 1:
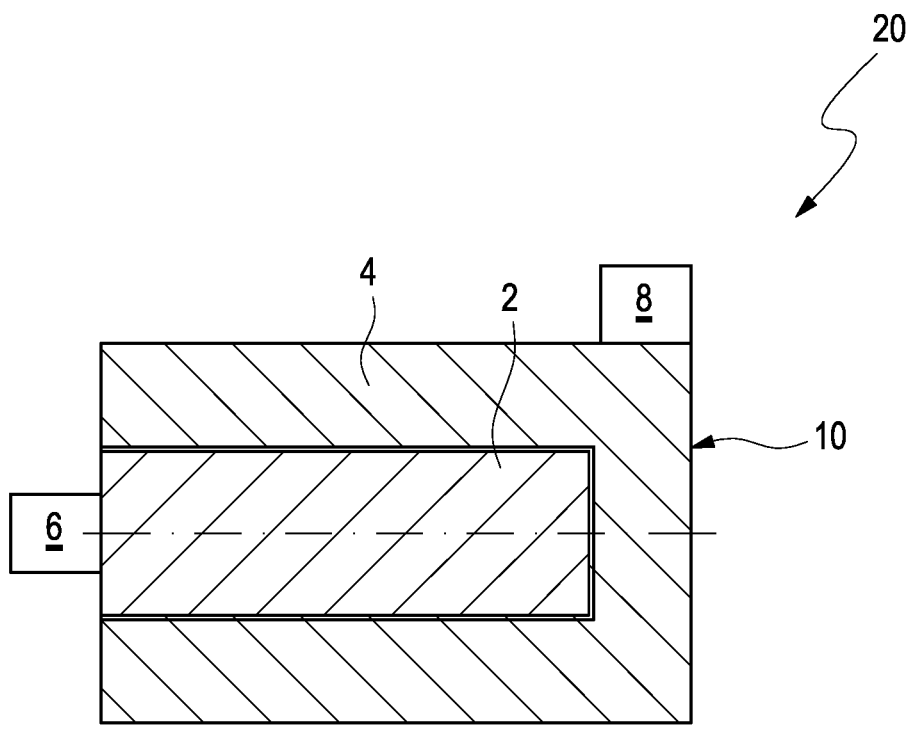
FIG. 1 shows in schematic representation one embodiment of an inverter according to the disclosure to carry out one embodiment of the method according to the disclosure.
Figure 2:
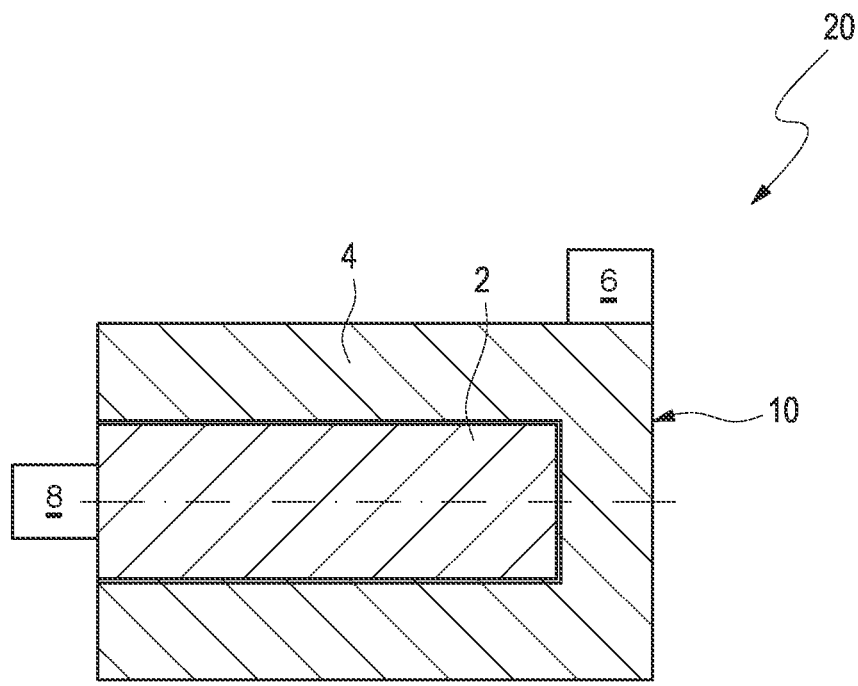
FIG. 2 shows in schematic representation another embodiment of an inverter according to the disclosure to carry out another embodiment of the method according to the disclosure.

FIG. 1 shows in schematic representation an electric machine 10, being designed here to drive a vehicle, such as a motor vehicle, and including as its components a rotor 2 and a stator 4, the rotor 2 here being arranged in a space surrounded by the stator 4 and rotating relative to the stator 4 inside the stator 4 during the operation of the electric machine 10. The electric machine 10 here is designed as an externally excited synchronous machine.

Furthermore, FIG. 1 shows the embodiment of the inverter 20 according to the disclosure including a DC/DC converter 6 and a DC/AC converter 8. It is proposed here that the inverter 20 is adapted here to connect the two aforementioned components of the electric machine 10 to an electric energy source not otherwise represented here, such as a direct current source and/or a DC voltage source. The electric machine 10 and the inverter 20 are coordinated with each other and form a cohesive system.

A first direct current terminal of the DC/DC converter 6 is connected to the electric energy source and a second direct current terminal of the DC/DC converter 6 is connected, for example across a slip ring carrier here, to the rotor 2 as the first component of the electric machine 10 and is adapted to transforming a direct current of the electric energy source into a direct current for the rotor 2. Moreover, a direct current terminal of the DC/AC converter 8 is connected to the electric energy source and an alternating current terminal of the DC/AC converter 8 is connected, for example across a conductor here, to the stator 4 as the second component of the electric machine 10 and is adapted to transforming a direct current of the electric energy source into an alternating current for the stator 4.

The DC/AC converter 8 includes at least one chip made of silicon carbide having at least one MOSFET, i.e., by definition at least one MOSFET made of silicon carbide. The DC/DC converter 6 includes at least one chip made of silicon having at least one IGBT, i.e., for example, an IGBT made of silicon.

German Patent Application No. 10 2020 116161.1, filed Jun. 18, 2020, to which this application claims priority, is hereby incorporated herein by reference in its entirety.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An inverter, comprising:
a Direct Current/Alternating Current (DC/AC) converter including at least one chip of silicon carbide having at least one Metal Oxide Semiconductor Field-Effect Transistor (MOSFET); and
a Direct Current/Direct Current (DC/DC) converter including at least one chip of silicon having at least one Insulated Gate Bipolar Transistor (IGBT),
wherein the DC/DC converter is connectible to a first one of a rotor and a stator included in an electric machine, wherein the rotor is arranged in a space surrounded by the stator and, in operation, rotates relative to the stator inside the stator during the operation of the electric machine, wherein the DC/AC converter is connectible to a second one of the rotor and the stator included in the electric machine, and wherein the first one of the rotor and the stator included in the electric machine is different from the second one of the rotor and the stator included in the electric machine.

2. The inverter according to claim 1, wherein the DC/AC converter is connectible to the stator and the DC/DC converter is connectible to the rotor.

3. The inverter according to claim 1, wherein the electric machine is an externally excited synchronous machine.

4. The inverter according to claim 1, further comprising a pulse inverter.

5. The inverter according to claim 1, wherein a first direct current terminal of the DC/DC converter and a direct current terminal of the DC/AC converter are respectively connectible to a direct current electric source, wherein a second direct current terminal of the DC/DC converter is connectible to the one of either the rotor or the stator of the electric machine, and wherein an alternating current terminal of the DC/AC converter is connectible to the other of either the rotor or the stator of the electric machine.

6. A method, comprising exchanging electric energy between an electric machine and an electric energy source having an inverter, wherein the electric machine includes: a rotor and a stator included in the electric machine, wherein the rotor is arranged in a space surrounded by the stator and, in operation, rotates relative to the stator inside the stator during the operation of the electric machine, wherein the inverter includes a Direct Current/Alternating Current (DC/AC) converter and a Direct Current/Direct Current (DC/DC) converter, wherein the DC/AC converter includes at least one chip of silicon carbide having at least one Metal Oxide Semiconductor Field-Effect Transistor (MOSFET) and the DC/DC converter includes at least one chip of silicon having at least one Insulated Gate Bipolar Transistor (IGBT), wherein the inverter is connected to the electric energy source, wherein the DC/DC converter is connected to a first one of the rotor and the stator included in the electric machine and the DC/AC converter is connected to a second one of the rotor and the stator included the electric machine, and wherein the first one of the rotor and the stator included in the electric machine is different from the second one of the rotor and the stator included in the electric machine.

7. The method according to claim 6, wherein the DC/DC converter is used to convert a first direct current of a direct current source into a second direct current for the one of the rotor or the stator of the electric machine, and wherein the DC/AC converter is used to convert the direct current of the direct current source into an alternating current for the other of the rotor or the stator of the electric machine.

8. The method according to claim 6, wherein the electric machine is part of a vehicle.

* * * * *